(12) United States Patent
Liu

(10) Patent No.: US 12,449,441 B2
(45) Date of Patent: Oct. 21, 2025

(54) VELOCITY DETECTION FOR MOTION CONDUCTOR IN MAGNETIC FIELD

(71) Applicant: Hans K Liu, Vernon Hills, IL (US)

(72) Inventor: Hans K Liu, Vernon Hills, IL (US)

(*) Notice: Subject to any disclaimer, the term of this patent is extended or adjusted under 35 U.S.C. 154(b) by 106 days.

(21) Appl. No.: 18/313,899

(22) Filed: May 8, 2023

(65) Prior Publication Data

US 2024/0377428 A1    Nov. 14, 2024

(51) Int. Cl.
*G01P 3/52*   (2006.01)
*H04R 29/00*  (2006.01)

(52) U.S. Cl.
CPC .............. *G01P 3/52* (2013.01); *H04R 29/001* (2013.01)

(58) Field of Classification Search
None
See application file for complete search history.

(56) References Cited

U.S. PATENT DOCUMENTS

| | | | | |
|---|---|---|---|---|
| 5,542,001 A | * | 7/1996 | Reiffin | H04R 3/002 381/400 |
| 5,771,300 A | * | 6/1998 | Daniels | G10K 11/1785 381/71.8 |
| 2004/0086140 A1 | * | 5/2004 | Fedigan | H04R 3/00 381/59 |
| 2020/0177990 A1 | * | 6/2020 | Turner | H03F 3/181 |

* cited by examiner

*Primary Examiner* — Walter F Briney, III

(57) ABSTRACT

Velocity detection is the crucial step for motion feedback and control. A dynamic loudspeaker can be conceptualized as a motion conductor within magnetic field. This invention calculates the velocity of a motion conductor, uses operational amplifier to emulate the calculation and realize the velocity detection.

4 Claims, 4 Drawing Sheets

VELOCITY DETECTION FOR MOTION CONDUCTOR IN MAGNETIC FIELD

PRIOR ART

The various aspects discussed herein relate to velocity detection for motion conductor operating in magnetic field, which is critical for motion feedback and control. Specifically, this applies to the dynamic loudspeaker, which can be conceptualized as a motion conductor in magnetic field. As such, discussions concerning velocity detection for motion conductor within magnetic field are also applicable to the issue of velocity detection for the voice coil of a dynamic loudspeaker.

The first known patent pertaining to velocity detection can be traced back to UK Patent UK272622. This patent proposes a technique whereby an auxiliary coil is utilized to detect the velocity of the speaker cone. However, the efficacy of this approach is impeded by the mutual inductance that arises between the auxiliary and voice coils, resulting in errors in the measurement of velocity.

An additional UK Patent, UK320713, proposes the utilization of a capacitor-based approach for detecting the velocity of the speaker cone. While this method is relatively straightforward, a significant obstacle arises from the fact that the minute size of the sensor capacitor leads to substantial noise due to the considerable difference in size between the environmental capacitor and the sensor capacitor.

The most recent approach for velocity detection involves the utilization of an acceleration transducer as a sensor affixed to the loudspeaker cone to measure and compute the velocity. Philips' technique, for instance, entails the use of a piezoelectric accelerometer to detect the motion acceleration and subsequently employ an integration circuit to calculate the velocity. Nevertheless, several challenges arise with this approach. Specifically, the presence of non-zero mass in the piezoelectric accelerometer results in a time delay in the transmission of velocity to the sensor. Furthermore, the integration circuit can introduce noise, thereby impairing the accuracy of the system.

BACKGROUND OF THE INVENTION

In order to regulate the velocity of a motion conductor in a magnetic field, it is essential to accurately detect the velocity. However, the existing methods for velocity detection are subject to various limitations, and thus, there is a pressing need for an enhanced approach to detect the velocity of a motion conductor within a magnetic field.

SUMMARY OF THE INVENTION

This invention calculates the velocity of a motion conductor within magnetic field, uses operational amplifier to emulate the calculation and realize the velocity signal. The velocity signal can be used as feedback to force the velocity to follow system input signal. A dynamic loudspeaker can be conceptualized as a motion conductor within magnetic field, this invention introduces effective ways for detecting the velocity of the loudspeaker motion coil.

DETAILED DESCRIPTION OF THE INVENTION

When applying voltage across a motion conductor within magnetic field, it forces the conductor to move. Velocity detection is the key for motion feedback and control. Given that a dynamic loudspeaker can be viewed as a motion conductor operating in a magnetic field, the velocity detection of the moving coil is crucial for producing high-quality sound.

When applying voltage $u_m$ across a motion conductor within magnetic field or a dynamic loudspeaker, we have the equation: $u_m = R*i + L*di/dt + Kv$; where R is the resistance, L is the inductance, i is the current, v is the velocity, and K is a constant in linear magnetic field. In order to detect the velocity v, we need to configure a sensing structure.

A sensing structure is a specially configured component connected electronically to the motion conductor or loudspeaker to derive a mathematical equation for velocity calculation, and the equation can be emulated by an electronic circuit to realize the velocity signal.

The utilization of operational amplifiers allows for a diverse range of mathematical operations to be executed, including addition, subtraction, multiplication, division, differentiation, and integration. Upon the configuration of a sensing structure and subsequent derivation of a mathematical equation for velocity calculation, it is feasible to design an electronic circuit with operational amplifiers to effectively emulate said equation and generate the velocity signal.

Figure 1:
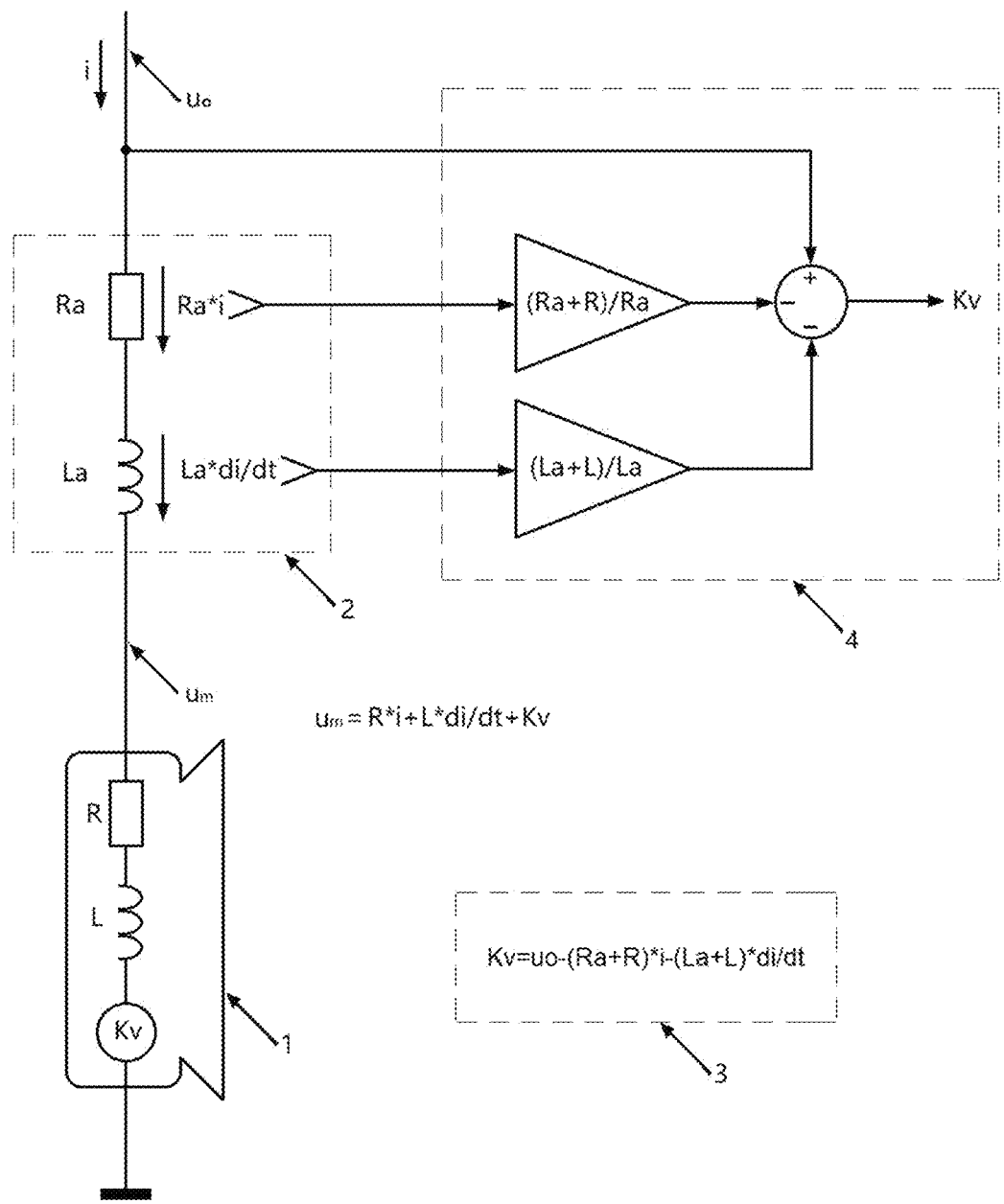
FIG. 1 is a circuit schematic of a velocity detection embodiment.

FIG. 1 is a circuit schematic of a velocity detection embodiment comprising a motion conductor in magnetic field 1 connected to a sensing structure 2, a derived velocity equation 3, and a circuit with operational amplifier 4. The voltage across the motion conductor 1 can be represented as $u_m = R*i + L*di/dt + Kv$, where R is the conductor's resistance, L is the conductor's inductance, i is the current, v is the velocity, and K is a constant in a linear system. We use a resistor Ra and inductance La to create the sensing structure 2. The voltage across the conductor 1 and sensing structure 2 can be represented as $u_o = (Ra+R)*i + (La+L)*di/dt + Kv$. Now that we have derived the velocity equation 3 which is $Kv = u_o - (Ra+R)*i - (La+L)*di/dt$, we can design a circuit using operational amplifier 4 to emulate the equation 3 and realize the Kv signal. According to the equation 3, we can feed three voltage signals to the operational amplifier circuit 4: the voltage $u_o$, the voltage across Ra which is Ra*i with gain (Ra+R)/Ra, and the voltage across La which is La*di/dt with gain (La+L)/La. The circuit 4 will have output Kv.

It is assumed in FIG. 1 that the inductance L of the motion conductor 1 remains constant; however, in practice, the inductance value of the motion conductor 1 is subject to frequency-dependent variations. Therefore, in the following discussion, we will explore an improved approach to mitigate this issue.

Figure 2:
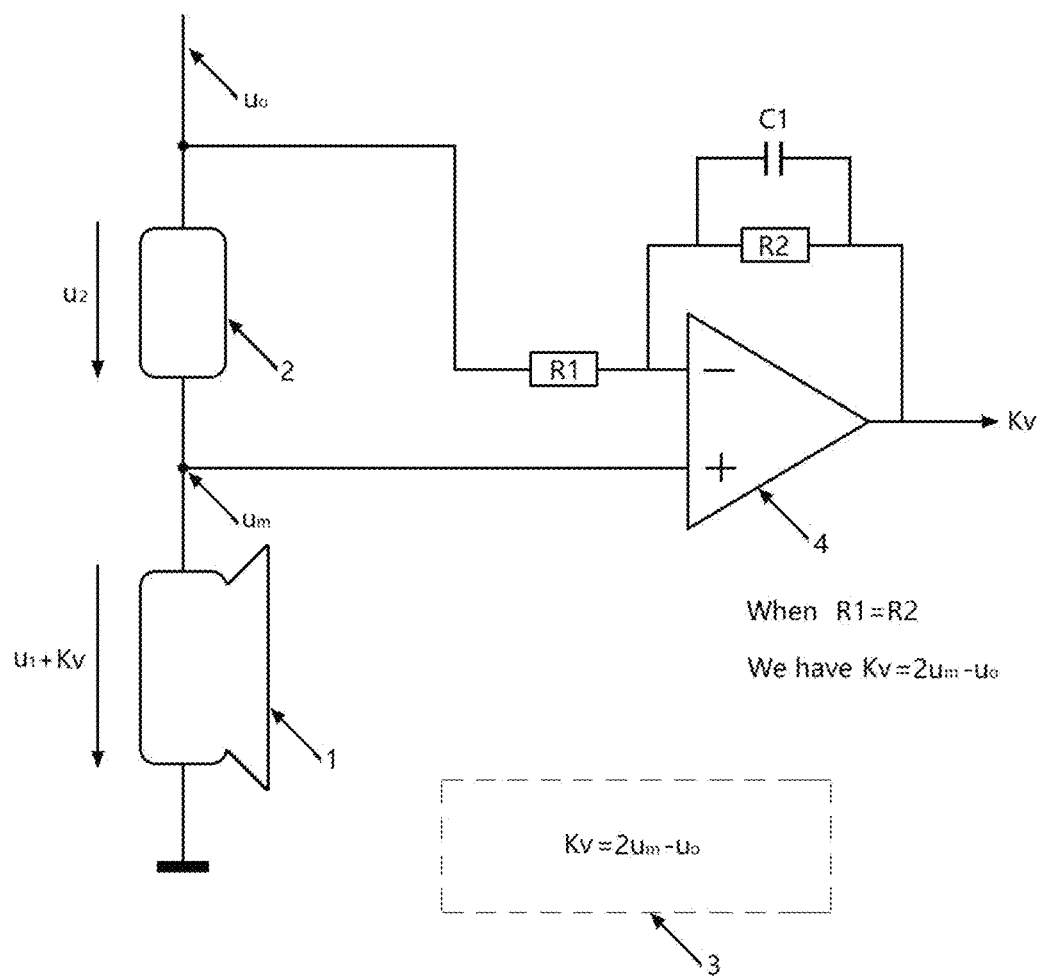
FIG. 2 is another circuit schematic of a velocity detection embodiment.

FIG. 2 is another circuit schematic of a velocity detection embodiment comprising a motion conductor in magnetic field 1 connected to a sensing structure 2, a derived velocity equation 3, and a circuit with operational amplifier 4. The voltage across the motion conductor 1 can be represented as $u_m = u1 + Kv$, the voltage across the sensing structure 2 can be represented as u2, the voltage across the conductor 1 and sensing structure 2 can be represented as $u_o=u2+u1+Kv$. If let u2=u1, then we will have the equation 3 which is $Kv=2u_m-u_o$. Now that we have the equation 3 to calculate the velocity, we need to create a sensing structure 2 to meet the condition of u2=u1, also to design an operational amplifier 4 to emulate the equation 3. An easy way to make the sensing structure 2 is to use an exact same device as the motion conductor 1 but eliminate the magnetic field or velocity. The operational amplifier circuit 4 has resistors R1 and R2, the capacitor C1 is used to stabilize the circuit. To emulate the equation 3 which is $Kv=2u_m-u_o$, we can let R1=R2.

After obtaining the velocity signal for the motion conductor, it can be employed as a feedback mechanism to align the motion conductor's output with the input signal of the system. The utilization of the method depicted in FIG. 2, using a 6.5" dynamic loudspeaker, in experimentation demonstrates that in the absence of velocity feedback, the output velocity substantially deviates from the input signal. On the contrary, the integration of velocity feedback leads to a noticeable modification in the power amplifier output, resulting in accurate alignment with the detected velocity signal.

Figure 3:
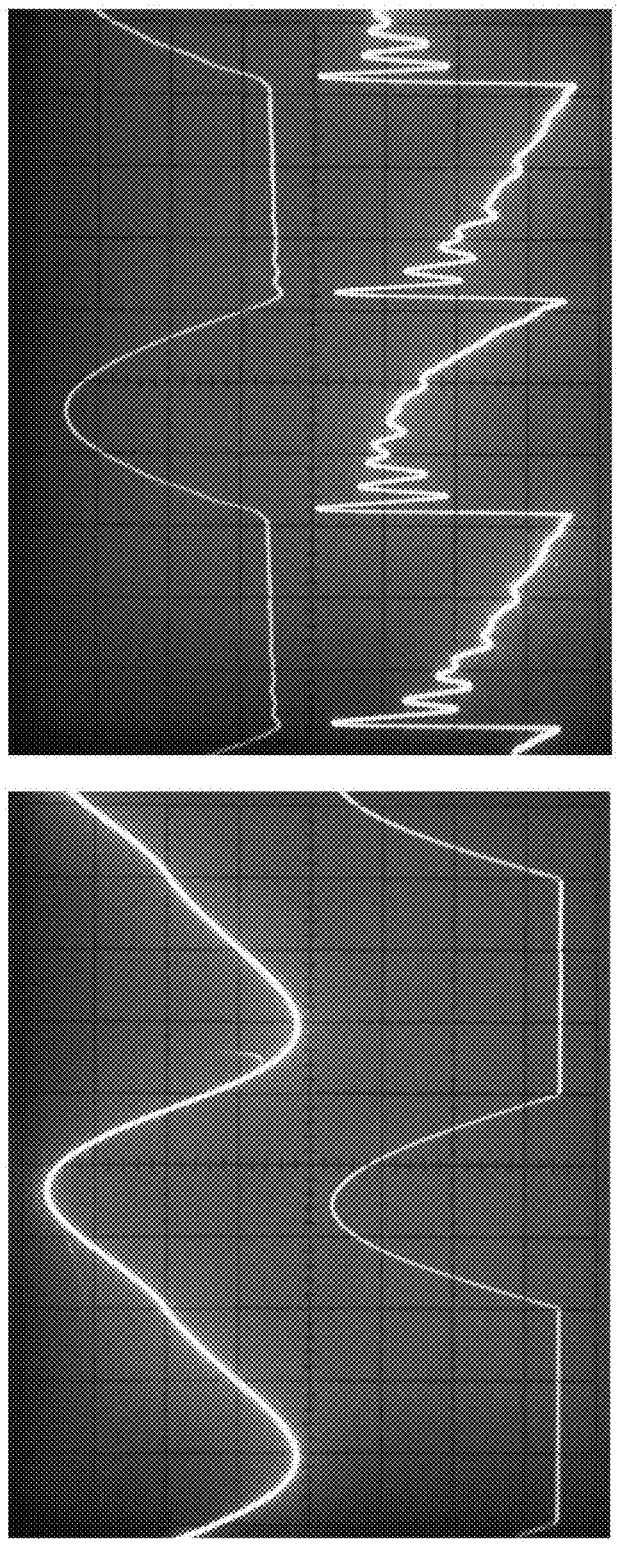
FIG. 3 presents the test results with half sin wave.

FIG. 3 presents the test results for the system input signal, which utilized a 100 Hz half sine wave. The left photo illustrates the test outcome without velocity feedback, while the right photo depicts the outcome with the incorporation of velocity feedback. In both photos, the bottom waveform denotes the power amplifier output $u_o$, while the top waveform represents the velocity.

Figure 4:
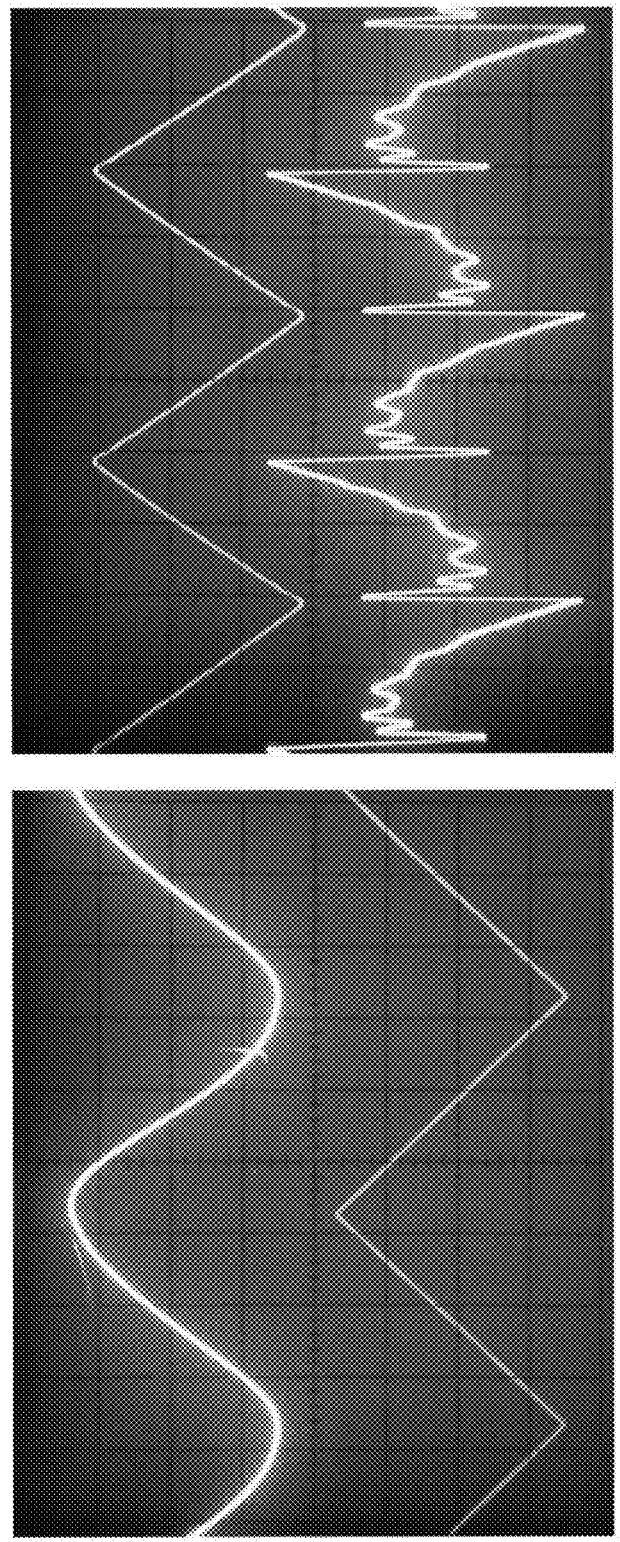
FIG. 4 presents the test results with ramp wave.

FIG. 4 presents the test results for the system input signal, which utilized a 100 Hz ramp wave. The left photo illustrates the test outcome without velocity feedback, while the right photo depicts the outcome with the incorporation of velocity feedback. In both photos, the bottom waveform denotes the power amplifier output $u_o$, while the top waveform represents the velocity.

After obtaining the accurate velocity signal, the feedback mechanism significantly transforms the driving behavior, allowing for a correspondingly adjusted driving voltage to force the motion conductor's velocity to closely follow the input signal. The development of a system capable of intentionally distorting the driving voltage renders previous endeavors to produce High Fidelity amplifiers, with distortion reduced to several decimal places, seemingly obsolete.

The invention claimed is:

1. A method for detecting the velocity of a motion conductor moving within a magnetic field, the method comprising: Providing a sensing structure that replicates the geometry and electrical configuration of the motion conductor without requiring components that do not contribute to said emulation or to the generation of the velocity-related signal, wherein the sensing structure is constructed to emulate the electromagnetic behavior of the motion conductor relevant to velocity detection, and wherein the sensing structure is further configured to operate without the presence of a magnetic field and/or relative motion; Establishing a velocity calculation model based on the electromagnetic properties of both the sensing structure and the motion conductor, wherein the model produces a velocity computation equation that is independent of parameter variations in the motion conductor and the sensing structure; and Utilizing an electronic circuit to implement the velocity calculation model and generate a velocity signal that is directly proportional to the velocity of the motion conductor.

2. The method of claim 1, wherein the motion conductor is a dynamic loudspeaker and the sensing structure replicates relevant components without requiring components that do not contribute to said emulation or to the generation of the velocity-related signal, such as diaphragm (cone), spider and basket.

3. An apparatus for determining the velocity of a motion conductor moving within a magnetic field, the apparatus comprising: A sensing structure replicates the geometry and electrical configuration of the motion conductor without requiring components that do not contribute to said emulation or to the generation of the velocity-related signal, wherein the sensing structure is constructed to emulate the electromagnetic behavior of the motion conductor relevant to velocity detection, and wherein the sensing structure is further configured to operate without the presence of a magnetic field and/or relative motion; A velocity calculation model based on the electromagnetic properties of both the sensing structure and the motion conductor, the model providing a velocity computation equation that is independent of parameter variations in the motion conductor and the sensing structure; and An electronic circuit configured to implement the velocity calculation model and generate a velocity signal that is directly proportional to the velocity of the motion conductor.

4. The apparatus of claim 3, wherein the motion conductor is a dynamic loudspeaker and the sensing structure replicates relevant components without requiring components that do not contribute to said emulation or to the generation of the velocity-related signal, such as diaphragm (cone), spider and basket.

\* \* \* \* \*